US010334253B2

(12) United States Patent
Kim et al.

(10) Patent No.: US 10,334,253 B2
(45) Date of Patent: Jun. 25, 2019

(54) SAMPLE ADAPTIVE OFFSET SCALING BASED ON BIT-DEPTH

(71) Applicant: QUALCOMM Incorporated, San Diego, CA (US)

(72) Inventors: Woo-Shik Kim, San Diego, CA (US); Joel Sole Rojals, La Jolla, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 662 days.

(21) Appl. No.: 14/243,707

(22) Filed: Apr. 2, 2014

(65) Prior Publication Data
US 2014/0301438 A1    Oct. 9, 2014

Related U.S. Application Data

(60) Provisional application No. 61/809,852, filed on Apr. 8, 2013.

(51) Int. Cl.
    *H04N 19/176*      (2014.01)
    *H04N 19/70*      (2014.01)
    (Continued)

(52) U.S. Cl.
    CPC .......... *H04N 19/176* (2014.11); *H04N 19/117* (2014.11); *H04N 19/136* (2014.11);
    (Continued)

(58) Field of Classification Search
    CPC .............................................. H04N 19/00066
    (Continued)

(56) References Cited

U.S. PATENT DOCUMENTS

2009/0097763 A1 * 4/2009 Chiu .................. H04N 1/64
    382/238
2009/0262798 A1 * 10/2009 Chiu .................. H04N 19/46
    375/240.01
(Continued)

FOREIGN PATENT DOCUMENTS

CA      2840045 A1 * 12/2012 ....... H04N 19/00066
CA      2840045 A1 * 12/2012 ............. H04N 19/70
(Continued)

OTHER PUBLICATIONS

C. M. Fu et al., "Sample Adaptive Offset in the HEVC Standard," in IEEE Transactions on Circuits and Systems for Video Technology, vol. 22, No. 12, pp. 1755-1764, Dec. 2012.*
(Continued)

*Primary Examiner* — Dave Czekaj
*Assistant Examiner* — Shanika M Brumfield
(74) *Attorney, Agent, or Firm* — Shumaker & Sieffert, P.A.

(57) ABSTRACT

This disclosure provides systems, methods and apparatus for sample adaptive offset (SAO) scaling. For example, the apparatus may include a processor configured to determine an offset value for an SAO filter applied to video data to improve reconstruction of signal amplitudes in the video data. The processor may be further configured to determine a first value indicative of a bit depth and a second value indicative of a scale factor for the video data, to provide a scaled offset value based on applying the scale factor to the offset value, and to scale at least one color component of the video data according to the scaled offset value. The processor may also be configured to identify an edge offset category for a scaled group of neighboring pixel values, and to adjust the SAO filter based on the identified edge offset category.

14 Claims, 11 Drawing Sheets

(51) Int. Cl.
*H04N 19/117* (2014.01)
*H04N 19/136* (2014.01)
*H04N 19/186* (2014.01)
*H04N 19/82* (2014.01)

(52) U.S. Cl.
CPC ........... *H04N 19/186* (2014.11); *H04N 19/70* (2014.11); *H04N 19/82* (2014.11)

(58) Field of Classification Search
USPC ......................................... 375/240.02–240.2
See application file for complete search history.

(56) References Cited

U.S. PATENT DOCUMENTS

| | | | | |
|---|---|---|---|---|
| 2012/0177107 | A1* | 7/2012 | Fu ........................... | H04N 19/61 375/240.03 |
| 2013/0083844 | A1* | 4/2013 | Chong ................. | H04N 19/463 375/240.02 |
| 2013/0177067 | A1* | 7/2013 | Minoo ................. | H04N 19/176 375/240.02 |
| 2013/0177068 | A1* | 7/2013 | Minoo ................. | H04N 19/117 375/240.02 |

FOREIGN PATENT DOCUMENTS

| | | | |
|---|---|---|---|
| CN | 102857746 A | 1/2013 | |
| CN | 102917215 A | 2/2013 | |
| JP | WO 2015163046 A1 * | 10/2015 | ........... H04N 19/136 |
| TW | 201309036 A | 2/2013 | |
| WO | 2012176910 A1 | 12/2012 | |
| WO | WO-2015163046 A1 * | 10/2015 | ........... H04N 19/136 |

OTHER PUBLICATIONS

Andersson K et al., "AhG6: SAO Simplification", 100. MPEG Meeting; Apr. 30, 2012-May 4, 2012; Geneva; (Motion Picture Expert Group or ISO/IEC JTC1/SC29/WG11), No. m24312, Apr. 22, 2012 (Apr. 22, 2012), XP030052657; pp. 1-5.

Bross B et al., "High Efficiency Video Coding (HEVC) Text Specification Draft 10 (for FDIS & Consent)", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-L1003, Jan. 17, 2013 (Jan. 17, 2013), XP030113948; pp. 1-310.

Fu et al., "Sample Adaptive Offset in the HEVC Standard," IEEE Transactions on Circuits and Systems for Video Technology, Dec. 2012, vol. 22, No. 12, pp. 1755-1764.

International Search Report and Written Opinion—PCT/US2014/032839—ISA/EPO—dated Aug. 29, 2014.

Kim W-S et al., "AhG5: Offset Scaling in SAO for High Bit-depth Video Coding", 13. JCT-VC Meeting; 104. MPEG Meeting; Apr. 18, 2013-Apr. 26, 2013; Inch Eon; (Joint Collaborative Team on Video Coding of ISO/IEC JTC1/SC29/WG11 and ITU-T SG.16) ; URL: http://wftp3.jtu.jnt/av-arch{jctvc-site/, No. JCTVC-M0335, Apr. 9, 2013 (Apr. 9, 2013), XP030114292; pp. 1-7.

Taiwan Search Report—TW103112873—TIPO—dated Mar. 7, 2016.

* cited by examiner

SAMPLE ADAPTIVE OFFSET SCALING BASED ON BIT-DEPTH

CROSS-REFERENCE TO RELATED APPLICATION

This application claims priority under 35 U.S.C. § 119(e) to U.S. Provisional Application No. 61/809,852, filed Apr. 8, 2013, which is hereby expressly incorporated by reference herein.

TECHNICAL FIELD

This disclosure generally relates to video coding and more particularly to sample adaptive offset (SAO) filtering in video coding processes, such as High Efficiency Video Coding (HEVC).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

The systems, methods, and devices of this disclosure each have several innovative aspects, no single one of which is solely responsible for the desirable attributes disclosed herein. One aspect of this disclosure provides an apparatus and method for video coding. The apparatus comprises a memory unit configured to store video data. The apparatus further comprises a processor operationally coupled to the memory unit. The processor may be configured to determine an offset value for a sample adaptive offset (SAO) filter applied to the video data to improve reconstruction of signal amplitudes in the video data. The processor may be further configured to determine a first value indicative of a bit depth and a second value indicative of a scale factor for the video data. The processor may be further configured to provide a scaled offset value based on applying the scale factor to the offset value, and to scale at least one color component of the video data according to the scaled offset value.

In related aspects, the processor may be configured to smooth block edges associated with at least one block in the video data based on applying a deblock filter to the at least one block of the video data. The processor may be further configured to scale a group of neighboring pixel values of the at least one block based at least in part on the scale factor applied to the offset value. The processor may be further configured to identify an edge offset category based at least in part on an edge shape of the scaled group, and to adjust an SAO filter based on the identified edge offset category. In further related aspects, methods performing functions of the apparatus are also provided.

DETAILED DESCRIPTION

Figure 1:
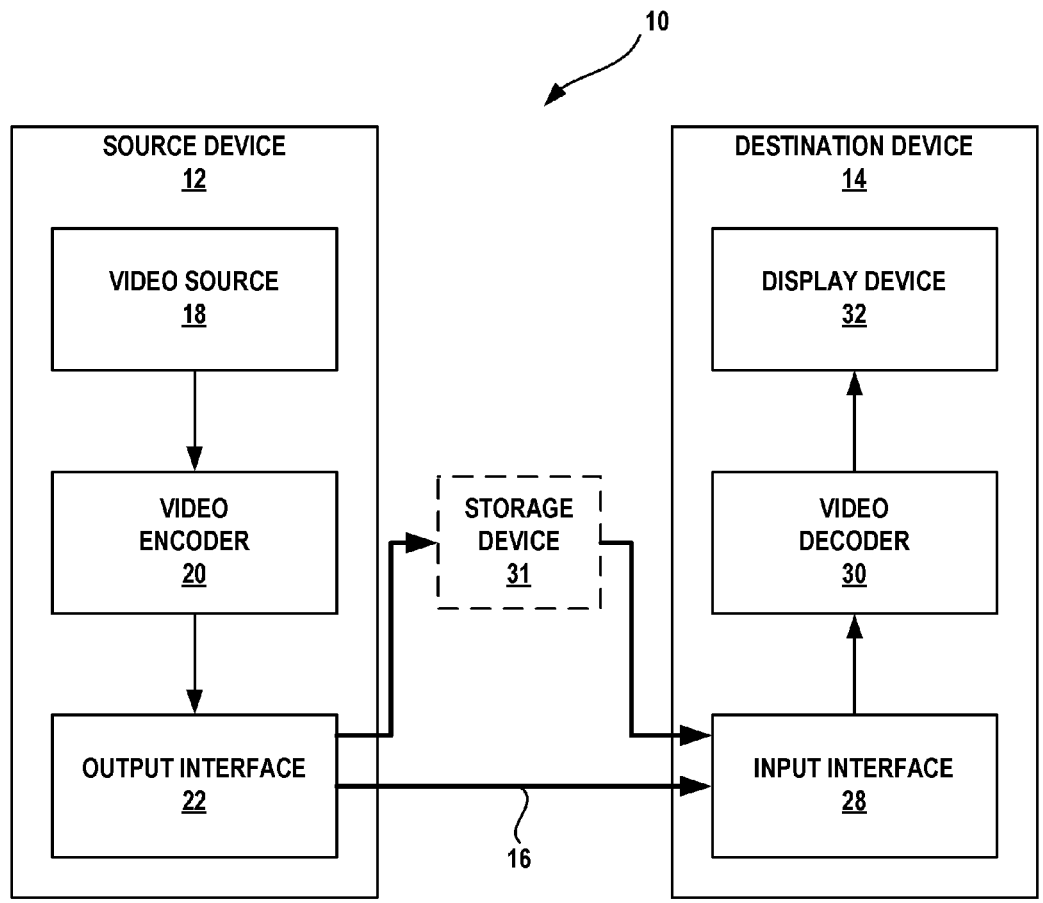
FIG. 1 is a block diagram illustrating an example video encoding and decoding system that may utilize the sample adaptive offset filtering techniques described in this disclosure.

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

High-Efficiency Video Coding (HEVC) is the international standard for video coding recently developed by the Joint Collaborative Team on Video Coding (JCT-VC) of ITU-T WP3/16 and ISO/IEC JTC 1/SC 29/WG 11. HEVC uses an in-loop filter known as Sample Adaptive Offset (SAO), which is applied after the deblocking filter. In SAO, an offset value is added to each pixel according to the SAO type and category. SAO parameters, including type and offset values, can be signaled for each largest coding unit (LCU) or coding tree unit (CTU). SAO type is signaled for luma and chroma separately, and the chroma SAO type is shared for Cb and Cr components. Four offsets can be signaled for each color component within an LCU or CTU.

In one approach to HEVC, the coded offset value range may depend on the bit-depth. The coded offset value range is [0, (1<<(Min(bitDepth, 10)−5))−1], and sign value is separately coded. For example, the range is [0, 7] for 8 bit video, [0, 15] for 9 bit video, and [0, 31] for bit-depths of 10 and above.

In one implementation, the decoded offset value may be linearly scaled for bit-depths greater than 10, as shown below.

$$\text{offset\_scaled} = \text{offset\_coded} << (\text{bitDepth}-10)$$

For example, when bit-depth is 12, each decoded offset value is multiplied by 4 before being added to each pixel.

When lower bit-depth video is generated from higher bit-depth video, tone mapping is used, which can be either linear or non-linear. Each color component can have different tone mapping. However, in certain implementations, only a linear scaling is applied for all color components according to the bit-depth of each color component. This can limit SAO performance and lead to coding efficiency loss, especially for the video with bit-depth higher than 10 bit.

Therefore, it is desirable to develop an offset scaling method/technique that can be changed according to the input sequence characteristics. This will allow SAO to fully show its efficiency to improve coding performance.

To mitigate or solve the problem, the present disclosure describes an offset mapping process in which the decoded offset value may be scaled according to a set of scaling parameters. The scaling parameters may include a scaling technique to choose among pre-defined mapping methods, including linear and non-linear scaling (the process of which may be referred to as "non-linearly scaling"), and a scaling factor to control mapping step size. Each color component (or group of color components) may have an independent scaling technique and a scaling factor. An advantage of this technique is that there is no need to change the entropy coding/decoding part, which may facilitate implementation of this technique on top of existing HEVC techniques or the like.

FIG. 1 is a block diagram illustrating an example video encoding and decoding system 10 that may utilize the SAO techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 31. Similarly, encoded data may be accessed from storage device 31 by input interface. Storage device 31 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 31 may correspond to a file server or another intermediate storage device that may hold the encoded video generated by source device 12. Destination device 14 may access stored video data from storage device 31 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 31 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 31 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to other video compression standards, including HEVC or the like. "HEVC Working Draft 9," or WD9, is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, remains downloadable from http://phenix.int-evry.fr/jct/doc_end user/documents/11_Shanghai/wg11/JCTVC-K1003-v8.zip, the entire content of which is incorporated herein by reference. The techniques of this disclosure, however, are not limited to any particular coding standard or technique.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The UM presumes several additional capabilities of video coding devices relative to existing devices according to, e.g., ITU-T H.264/AVC. For example, whereas H.264 provides nine intra-prediction encoding modes, the UM may provide as many as thirty-three intra-prediction encoding modes.

In general, the working model of the UM describes that a video frame or picture may be divided into a sequence of coding tree units (CTUs), also referred to as largest coding units (LCUs), that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, the addition of offset values to pixels in an LCU or other coding unit may improve coding in some instances. For example, offset values may be applied to pixels of a reconstructed video block in order to compensate for illumination changes, quantization errors, or more generally, to make decoded video data more closely resemble original video data. SAO techniques allow for different offset values to be applied to different pixels (or blocks of pixels) depending on the pixel values of a pixel (or block). The offset value to be applied to a pixel can be determined based on the value of a pixel. For example, if a pixel has a value that is within a first band, then an offset associated with the first band can be applied to the pixel. If the pixel has a value that is within a second band, then an offset associated with the second band can be applied to the pixel, and so on for all bands.

In one type of SAO implementation, each partition (which consists of a set of LCUs) can have one of three offset types (also called pixel classifications). The three offset types are no offset, band classification based offset type 0/1, and edge classification based types EO0/EO1/EO2/EO3. EO0 classification SAO may include determining an edge index value for a current pixel, or component thereof, using surrounding pixels positioned to the right and left of the current pixel (also referred to herein as "horizontal surrounding" pixels). EO1 classification SAO may include determining an edge index value for a current pixel, or component thereof, using surrounding pixels positioned above and below the current pixel (also referred to herein as "vertical surrounding" pixels). EO2 classification SAO may include determining an edge index value for a current pixel, or component thereof, using surrounding pixels positioned at the above left and below right of the current pixel (also referred to herein as being positioned at negative 45 degrees relative to the current pixel). EO3 classification SAO may include determining an edge index value for a current pixel, or component thereof, using surrounding pixels positioned at the above right and below left of the current pixel (also referred to herein as being positioned at 45 degrees relative to the current pixel).

As described in greater detail below, aspects of this disclosure generally relate to an offset mapping process in which the decoded offset value is scaled according to a set of scaling parameters. The techniques of this disclosure may be performed by video encoder 20 or video decoder 30.

Figure 2:
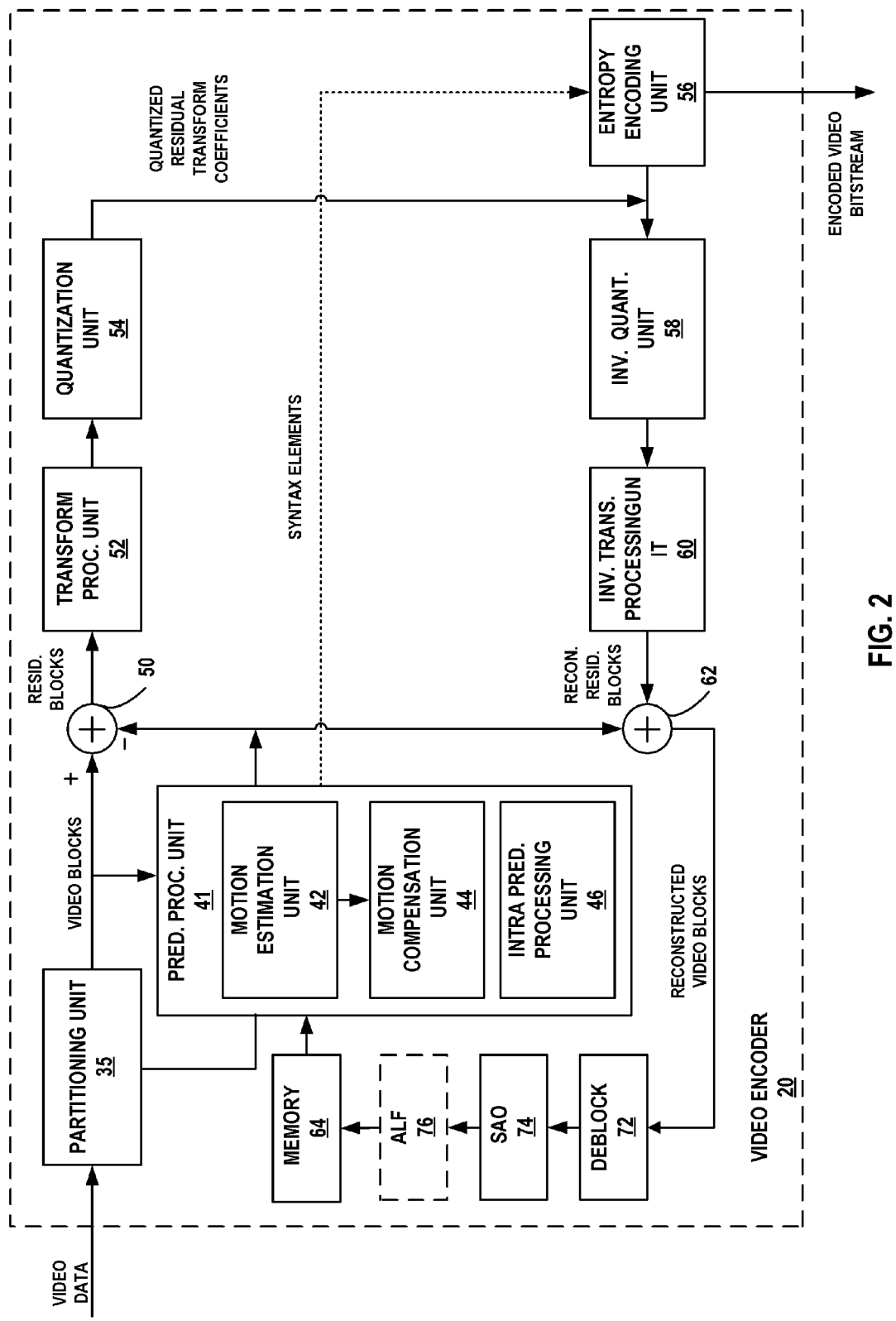
FIG. 2 is a block diagram illustrating an example video encoder that may implement the sample adaptive offset filtering techniques described in this disclosure.

FIG. 2 is a block diagram illustrating an example video encoder 20 that may implement the SAO signaling techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Deblocking filter 72 may also be included to filter block boundaries to remove blockiness artifacts from reconstructed video. As shown in FIG. 2, video encoder 20 also includes additional loop filters, including SAO filter 74 and an optional adaptive loop filter (ALF) 76. Although deblocking filter 72 and SAO filter 74, and optional ALF 76 are shown as being in-loop filters in FIG. 2, in some configurations deblocking filter 72, SAO filter 74, and optional ALF 76 may be implemented as post-loop filters. Additionally, one or more of deblocking filter 72 and optional ALF 76 may be omitted in some implementations of the techniques of this disclosure. In particular, ALF 76 would be omitted in implementations for HEVC, since ALF 76 does not exist in HEVC.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, which may include a partition size, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as predicted slices (P slices), bi-direction predicted slices (B slices), or generalized PB slices (GPB slices). Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may perform intra-prediction on a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and prediction processing unit 41 may select an appropriate intra-prediction or inter-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, prediction processing unit 41 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64.

Prior to storage in memory 64, the reconstructed residual block can be filtered by one or more filters. If desired, deblocking filter 72 may also be applied to filter the reconstructed residual blocks in order to remove blockiness artifacts. Other loop filters (either in the coding loop or after the coding loop) may also be used to smooth pixel transitions, or otherwise improve the video quality. One example of such a loop filter is SAO filter 74. The reference block may be used by motion estimation unit 42 and motion compensation unit 44 as a reference block to inter-predict a block in a subsequent video frame or picture.

SAO filter 74 can determine offset values for SAO filtering in a manner that improves video coding quality. Improving video coding quality may, for example, involve determining offset values that make a reconstructed image more closely match an original image. Video encoder 20 may, for example, code the video data using multiple passes with different offset values and choose, for inclusion in an encoded bitstream, the offset values that offer a desirable coding quality, as determined based on a rate-distortion calculation, for example.

In some configurations, SAO filter 74 may be configured to apply one or more types of offset, such as edge offset described above. SAO filter 74 may also at times apply no offset, which can itself be considered a third type of offset. The type of offset applied by SAO filter 74 may be either explicitly or implicitly signaled to a video decoder. When applying edge offset, pixels can be classified based on edge information.

In some examples, as described in greater detail with respect to FIG. 4 below, video encoder 20 may perform an offset mapping process in which the decoded offset value is scaled according to a set of scaling parameters.

Video encoder 20 of FIG. 2 represents an example of a video encoder configured to determine a first edge index, wherein the first edge index comprises an edge index for a luma component of a first surrounding pixel, determine a second edge index, wherein the second edge index comprises an edge index for a luma component of a second surrounding pixel, determine a third edge index based on the first edge index and the second edge index, wherein the third edge index comprises an edge index for a chroma component of a current pixel, select an offset based on the third edge index, and apply the offset to the chroma component of the current pixel.

Figure 3:
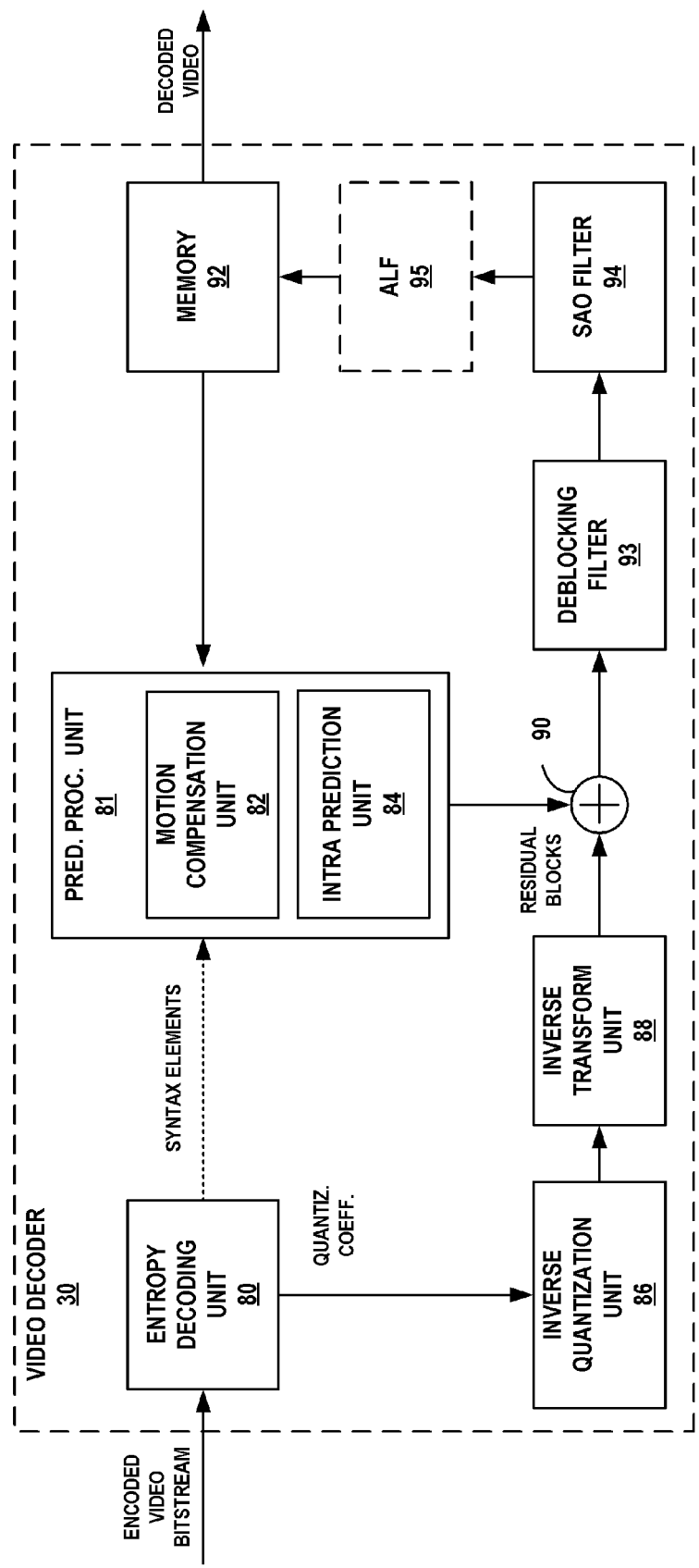
FIG. 3 is a block diagram illustrating an example video decoder that may implement the sample adaptive offset filtering techniques described in this disclosure.

FIG. 3 is a block diagram illustrating an example video decoder 30 that may implement the SAO techniques described in this disclosure. In the example of FIG. 3, video decoder 30 includes an entropy decoding unit 80, prediction processing unit 81, inverse quantization unit 86, inverse transformation unit 88, summer 90, and reference picture memory 92. Prediction processing unit 81 includes motion compensation unit 82, for inter-prediction decoding, and intra prediction processing unit 84, for intra-prediction decoding. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. The decoded video blocks formed by summer 90 may then be filtered by a deblocking filter 93, SAO filter 94, and optional ALF 95. Optional ALF 95 represents an optional filter that may be excluded from some implementations. It is noted that ALF 95 would be omitted in implementations for HEVC, since ALF 95 does not exist in HEVC. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In related aspects, SAO filter 94 can be configured to apply one or more of the same filtering (e.g., edge offset and band offset) as SAO filter 74 discussed above.

Video decoder 30 of FIG. 3 represents an example of a video decoder configured to determine a first edge index, wherein the first edge index comprises an edge index for a luma component of a first surrounding pixel, determine a second edge index, wherein the second edge index comprises an edge index for a luma component of a second surrounding pixel, determine a third edge index based on the first edge index and the second edge index, wherein the third edge index comprises an edge index for a chroma component of a current pixel, select an offset based on the third edge index, and apply the offset to the chroma component of the current pixel.

Figure 4:
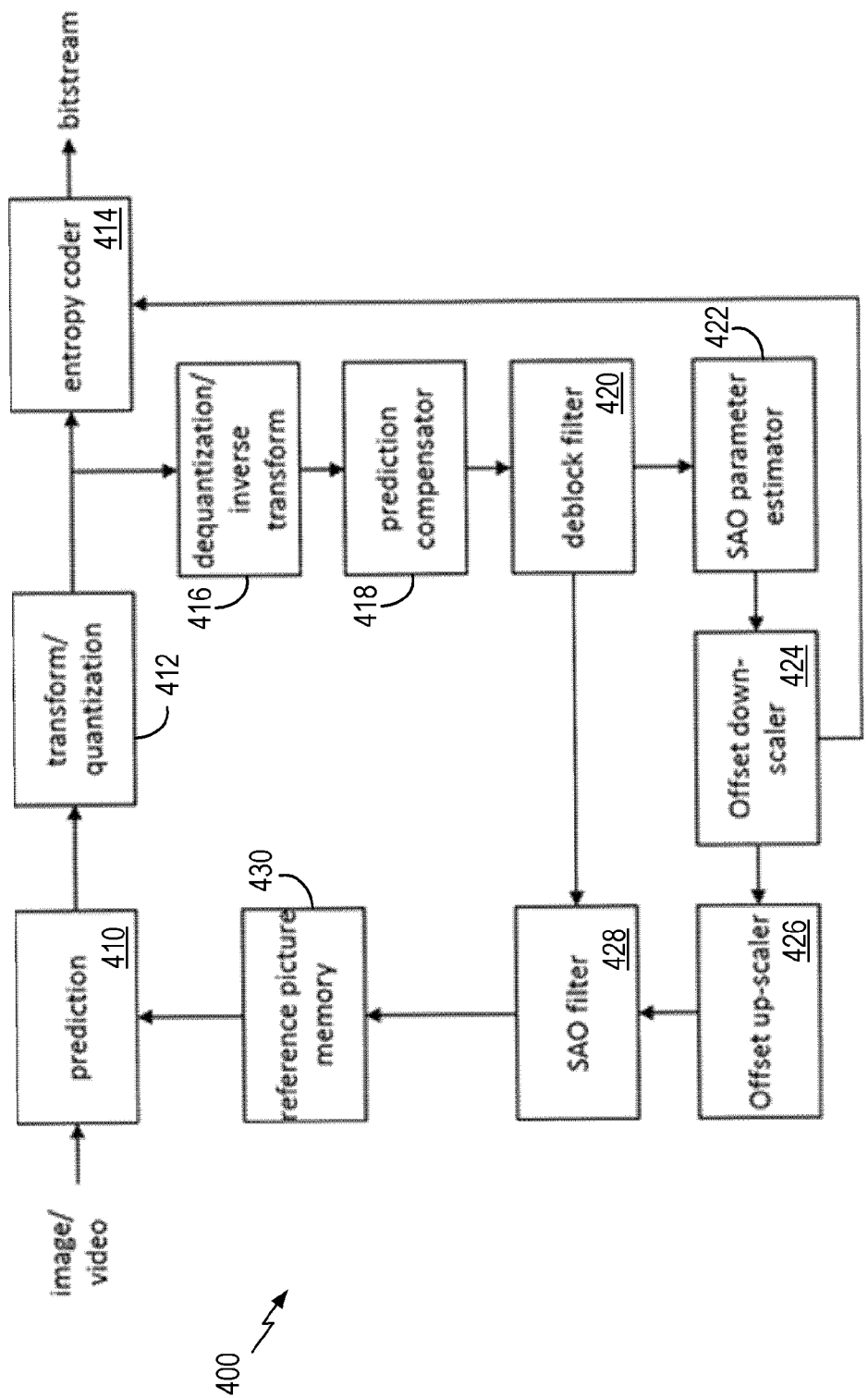
FIG. 4 is a block diagram illustrating another example video encoder that may implement the sample adaptive offset filtering techniques described in this disclosure.
Figure 5:
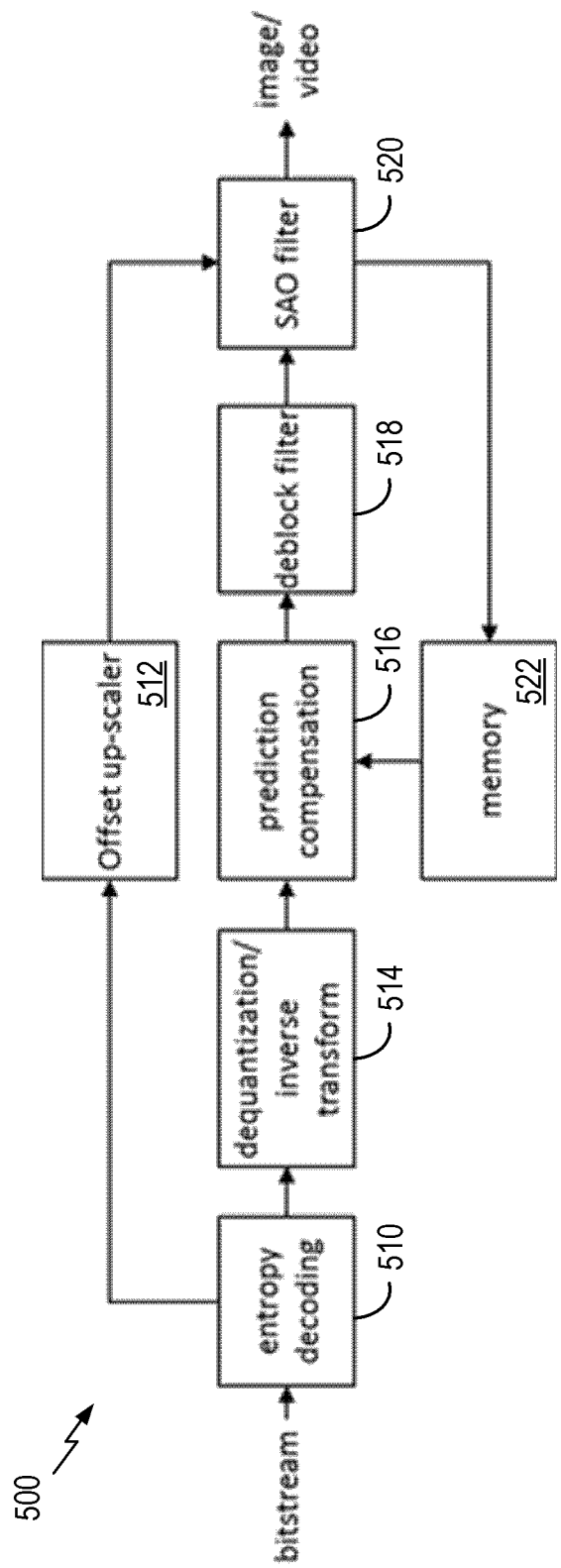
FIG. 5 is a block diagram illustrating another example video decoder that may implement the sample adaptive offset filtering techniques described in this disclosure.

In accordance with one or more aspects of the present disclosure, FIGS. 4 and 5 show block diagrams of an encoder and a decoder, respectively, with the bit-depth adaptive SAO offset scaler. The example encoder 400 and decoder 500 shown in FIGS. 4 and 5 may be implemented alternatively to, or in conjunction with video encoder 20 of FIG. 2 or video decoder 30 of FIG. 3 described above.

With reference to FIG. 4, the encoder 400 may include various components, such as a prediction processing unit 410 that receives image/video data. The prediction processing unit 410 may be operatively coupled to a transform/quantization unit 412, which is operatively coupled to both an entropy encoder 414 and a dequantization/inverse transform unit 416 as shown. The entropy encoder 414 may provide an encoded video bitstream. The inverse transform unit 416 may be operatively coupled to a prediction compensator 418, which is operatively coupled to a deblock filter 420, which is operatively coupled to both an SAO filter 428 and an SAO parameter estimator 422. The SAO parameter estimator 422 may be operatively coupled to an offset down-scaler 424, which is coupled to both the entropy encoder 414 and an offset up-scaler 426. The offset up-scaler 426 may be operatively coupled to the SAO filter 428, which is operatively to reference picture memory 430, which is in turn operatively coupled to the prediction processing unit 410.

It is noted that many of the components of the encoder 400 correspond to the components of the encoder 20 described above with reference to FIG. 2. In the example of the encoder 400 in FIG. 4, however, the SAO parameter estimator 422 works in conjunction with the offset down-scaler 424 and the offset up-scaler 426 to scale down the estimated offset value, and then scale up the estimated offset value, before the applying the estimated offset value to each pixel to avoid mismatch with a decoder (e.g., the decoder 500 of FIG. 5).

With reference to FIG. 5, the decoder 500 may include various components, such as an entropy decoding unit 510 that receives a encoded video bitstream. The entropy decoding unit 510 may be operatively coupled to an offset up-scaler 512 and a dequantization/inverse transform unit 514. The offset up-scaler 512 may be operatively coupled to an SAO filter 520. The inverse transform unit 514 may be coupled to a prediction compensation unit 516, which is operatively coupled to a deblock filter 518, which is operatively coupled to the SAO filter 520 as shown. The SAO filter 520 may provide the decoded image/video data and may be operatively coupled to a memory unit 522, which is operatively coupled to the prediction compensation unit 516 as shown.

While many of the components of the decoder 500 correspond to the components of the decoder 30 described above with reference to FIG. 3, the arrangement and configuration relative to neighboring components is different. Further, in the example of the decoder 500 of FIG. 5, there is included the offset up-scaler 512 in communication with the SAO filter 520. It is again noted that, in the examples shown in FIGS. 4 and 5, at the encoder 400 side, the estimated offset value is first scaled down and then scaled up before applied to each pixel to avoid mismatch with the decoder 500. Examples of offset scaling based on bit-depth are provided below.

In one example, linear scaling with flexible scaling factor for each color component may be performed by the encoder and/or the decoder (e.g., the SAO parameter estimator 422, the offset down-scaler 424, and the offset up-scaler 426 of the encoder 400 in FIG. 4, and/or the offset up-scaler 512 in FIG. 5). For example, the coded/decoded offset value is scaled linearly as in HEVC but with the specified scale factor as below. The scale factor can be different for each color component (or group of color components, i.e., one for luma and another for chroma).

$$\text{offset\_scaled} = \text{offset\_coded} << \text{scale\_factor}$$

In another embodiment, the HEVC function $$\text{offset\_scaled} = \text{offset\_coded} << (\text{bitDepth} - \text{Min}(\text{bitDepth}, 10))$$

is applied to the chroma components, while a separate scale factor is used for the luma component, where the scale factor can be either signaled explicitly or can be fixed for the given bit-depth.

In another example, non-linear scaling with flexible scaling factor for each color component may be performed by the encoder and/or the decoder. The coded/decoded offset value is scaled in a non-linear way. The C-style code below illustrates how this non-linear mapping can be implemented.

```
offset_ scaled = 0;
for( Int i = 0; i < offset_coded; i++ )
{
    offset_ scaled += 1 << ( (i>>3) + (scale_factor −1) );
}
``` where << and >> are the left and right bit-shift operators, respectively.

It is noted that the loop in the above example may be combined with the entropy decoding procedure of "offset_coded", which can further reduce computational complexity. Table 1 below shows the coded/decoded offset values and scaled offset values according to this example when scale_factor=2.

TABLE 1

Mapping of coded offset value and scaled offset value
using non-linear mapping with scale factor of 1 and 2.

| offset_coded | offset_scaled scale_factor = 1 | offset_scaled scale_factor = 2 |
|---|---|---|
| 0 | 0 | 0 |
| 1 | 1 | 2 |
| 2 | 2 | 4 |
| 3 | 3 | 6 |
| 4 | 4 | 8 |
| 5 | 5 | 10 |
| 6 | 6 | 12 |
| 7 | 7 | 14 |
| 8 | 8 | 16 |
| 9 | 10 | 20 |
| 10 | 12 | 24 |
| 11 | 14 | 28 |
| 12 | 16 | 32 |
| 13 | 18 | 36 |
| 14 | 20 | 40 |
| 15 | 22 | 44 |
| 16 | 24 | 48 |
| 17 | 28 | 56 |
| 18 | 32 | 64 |
| 19 | 36 | 72 |
| 20 | 40 | 80 |
| 21 | 44 | 88 |
| 22 | 48 | 96 |
| 23 | 52 | 104 |
| 24 | 56 | 112 |
| 25 | 72 | 128 |
| 26 | 88 | 144 |
| 27 | 104 | 160 |
| 28 | 120 | 176 |
| 29 | 136 | 192 |
| 30 | 152 | 208 |
| 31 | 168 | 224 |

As shown above and with reference to FIG. 6, non-linear mapping can be performed using simple shift and addition operations. To fully reflect tone-mapping characteristics, one may use a table mapping, in which a table contains one-to-one mapping of coded/decoded offset value and scaled offset value. Other non-linear mappings may also be implemented.

Figure 6:
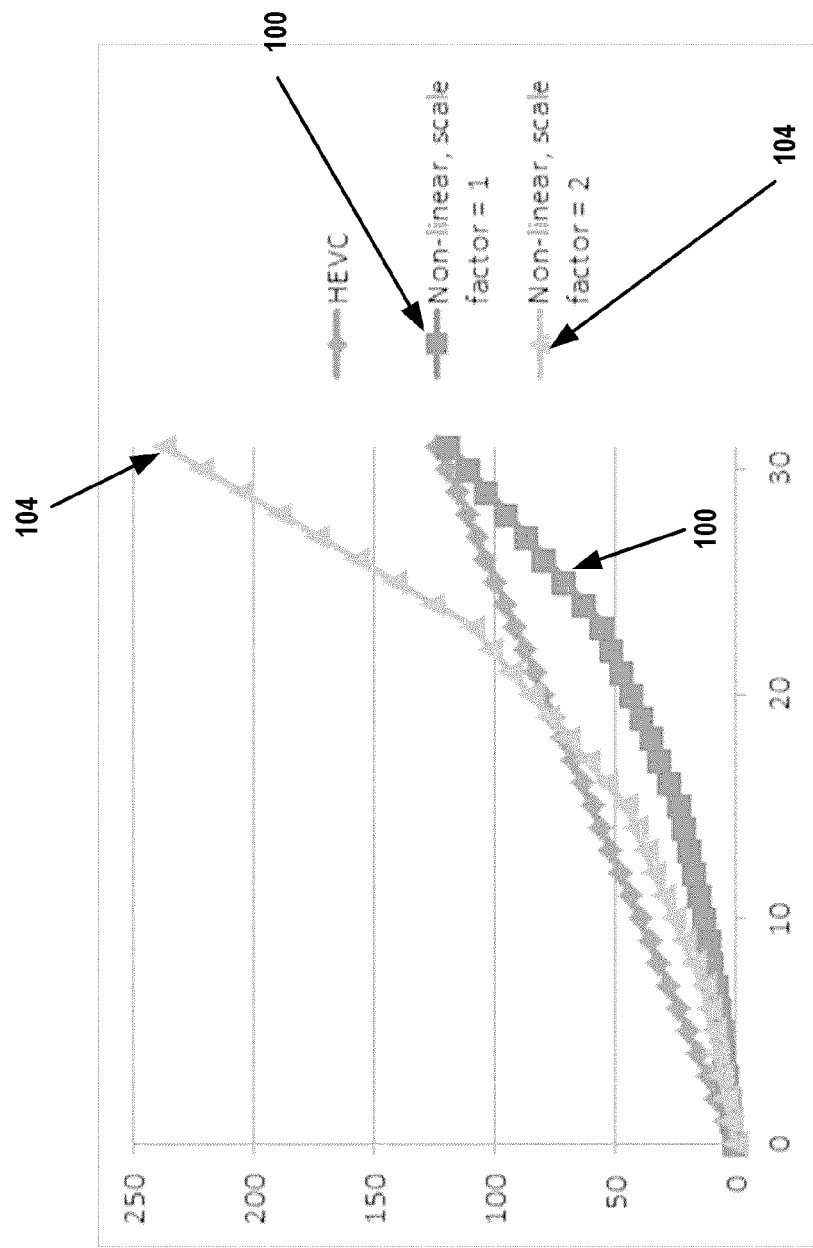
FIG. 6 is an illustration showing example mapping curves between coded offset values and scaled offset values according to various mapping methods, in accordance with one or more aspects of this disclosure.

For instance, as shown in FIG. 6, a piece-wise linear mapping may be used in which each part of the mapping is linear with different slope. For example, the linear equation with scale_factor of 1 may be used when the "offset_coded" is less than 8 (trace 100 in FIG. 6), and scale_factor of 2 (trace 104 in FIG. 6) may be used otherwise.

In another example, a combination of linear and non-linear scaling may be performed by the encoder and/or decoder. For example, it is possible to choose a specific scaling technique and scaling factor for a given bit-depth and a given color component. For example, when the bit-depth is larger than 10, a non-linear scaling approach specified above may be applied to luma component with scaling factor of 2, while a linear scaling may be applied to chroma components with scaling factor of 2.

The scaling technique and scaling factor for each color component (or group of color components) may be signaled explicitly. For example, these parameters may be signaled at the level of a sequence parameter set (SPS), a picture parameter set (PPS), slice header or LCU/CTU. For backward compatibility with HEVC working draft version 1, in one example, such approaches may be applied when the bit-depth is larger than 10.

In some instances, non-scaling may be performed. For example, the above-described linear scaling technique with scale factor 0 may mean non-scaling. In such a case, the value of the coded/decoded offset value may be exactly the same with the offset value applied to each pixel. In one example, the offset value range may not change. In another example, the offset value range may be increased to cover offset values with a large magnitude (e.g., an offset value that exceeds a defined or threshold magnitude value). In some instances, non-scaling may be applied only to the luma component, while linear scaling (e.g., as specified in HEVC or the like) may be applied to the chroma component. In other instances, non-scaling may be applied to both the luma and chroma components.

In some examples, pixel value scaling for edge offset categorization may be performed. In such an approach, the SAO offset may be scaled according to one of the examples described above, and additionally the pixel value after the deblock filter may be scaled similarly as the SAO offset to determine an edge offset category.

Figure 7:
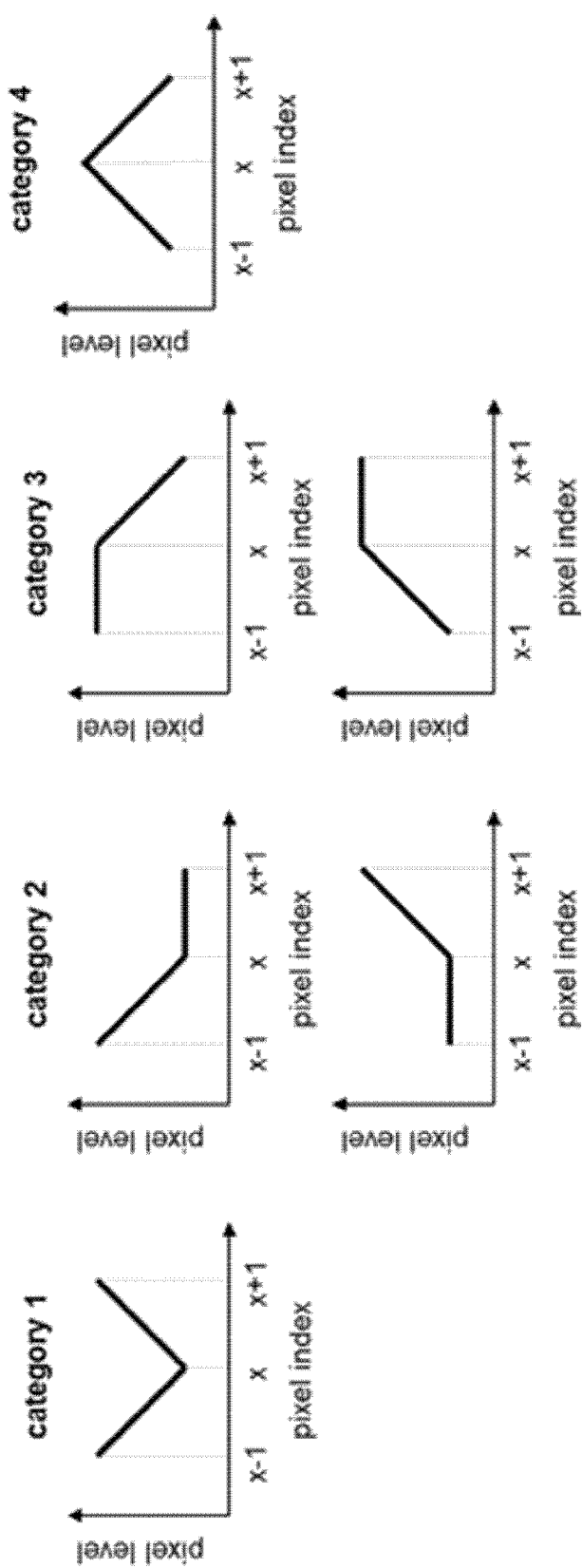
FIG. 7 is an illustration showing examples of four of edge categories.

In HEVC, five edge categories may be defined according to an edge shape. FIG. 7 illustrates four of the edge categories (i.e., the four edge shapes on the top line), whereas other edge shapes not falling into one of these four categories (e.g., the two edge shapes on the bottom line) may be classified under "other" category (category 0).

To determine an edge category, the neighboring pixels may be compared to check or determine the edge shape. As one example, the neighboring pixels may be compared to one another, or to a current pixel, to check whether a determined edge shape is accurate. In such an approach, the current pixel and the neighboring pixels may be scaled in a manner similar to scaling of the SAO offset. For example, when bit-depth is larger than 10, the current pixel and the neighboring pixels may be scaled down linearly as $$p'=p\texttt{>>}(\text{bitDepth}-\text{Min}(\text{bitDepth},10))$$

where p is the pixel value after deblock filtering. It is noted that p' is used to determine the edge offset category and that the offset value is added to p. Similar operation(s) may be performed when non-linear scaling is implemented.

Figure 8:
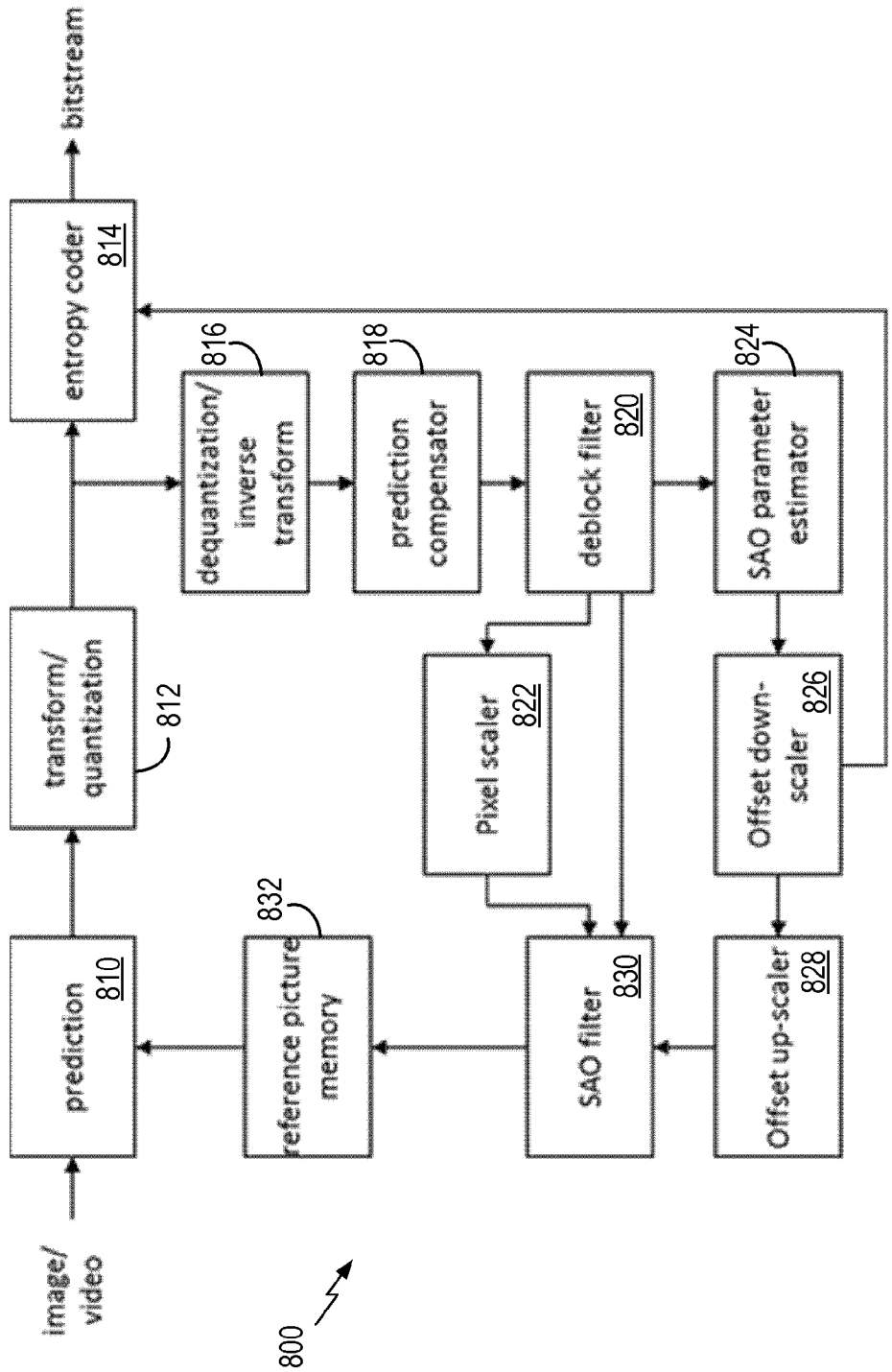
FIG. 8 is a block diagram illustrating an example of a video encoder with a pixel scaler, according to one or more aspects of this disclosure.
Figure 9:
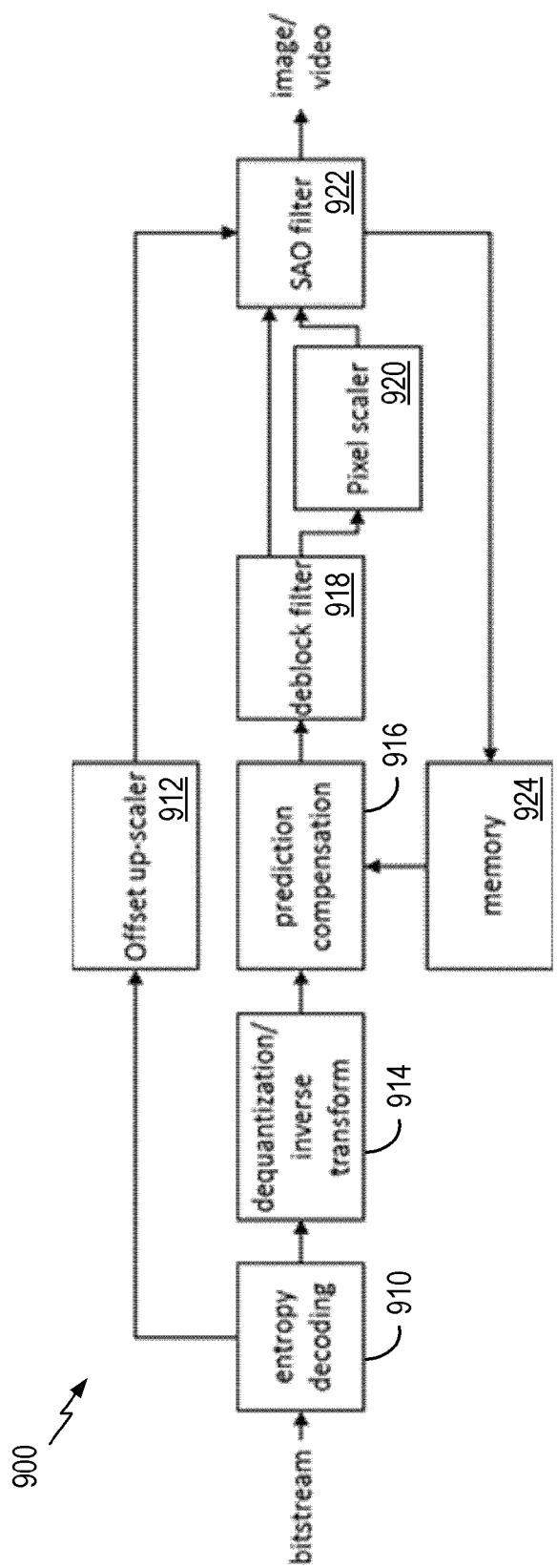
FIG. 9 is a block diagram illustrating an example of a video decoder with a pixel scaler, according to one or more aspects of this disclosure.

The example video encoder 800 shown in FIG. 8 and video decoder 900 shown in FIG. 9 may be used to carry out the pixel scaling operations described above. FIG. 8 provides a block diagram illustrating an example of the video encoder 800 with a pixel scaler 822, according to aspects of this disclosure. In one implementation, the pixel scaler 822 may be operatively coupled to a deblock filter 820 and an SAO filter 830 as shown. It is noted that the components of the encoder 800, other than the pixel scaler 822, shown in FIG. 8 are the same as the components of the encoder 400 of FIG. 4. It is further noted that the component(s) of the encoder 800 may be arranged slightly differently, and the pixel scaler 822 may be in direct or indirect communication with other component(s) of the encoder 800.

FIG. 9 provides a block diagram illustrating an example of the video decoder 900 with a pixel scaler 920, according to aspects of this disclosure. In one implementation, the pixel scaler 920 may be operatively coupled to a deblock filter 918 and an SAO filter 922 as shown. It is noted that the components of the decoder 900, other than the pixel scaler 920, shown in FIG. 9 are the same as the components of the decoder 500 of FIG. 5. It is further noted that the component(s) of the decoder 900 may be arranged slightly differently, and the pixel scaler 918 may be in direct or indirect communication with other component(s) of the decoder 900.

In some instances, the video encoder 800 and the video decoder 900 shown in FIGS. 8 and 9, respectively, or variations thereof, may be used in conjunction with or in lieu of the other example encoders/decoders, or components thereof, described in this disclosure. For example, components of the video encoder shown in FIG. 9 (e.g., the pixel scaler 822, the SAO parameter estimator 824, the offset down-scaler 826, and the offset up-scaler 828) may be implemented with video encoder 20 of FIG. 2 to carry out the techniques of this disclosure. Likewise, one or more components of the video decoder shown in FIG. 9 (e.g., the pixel scaler 920 and the offset up-scaler 912) may be used in conjunction with video decoder 30 of FIG. 3 to carry out the techniques of this disclosure.

As described in this disclosure, "video coding" may refer to video encoding and/or video decoding. Moreover, a "video coder" may refer to a video encoder (such as video encoder 20, 400, 800, or variations thereof) or a video decoder (such as video decoder 30, 500, 900, or variations thereof), as applicable.

Figure 10:
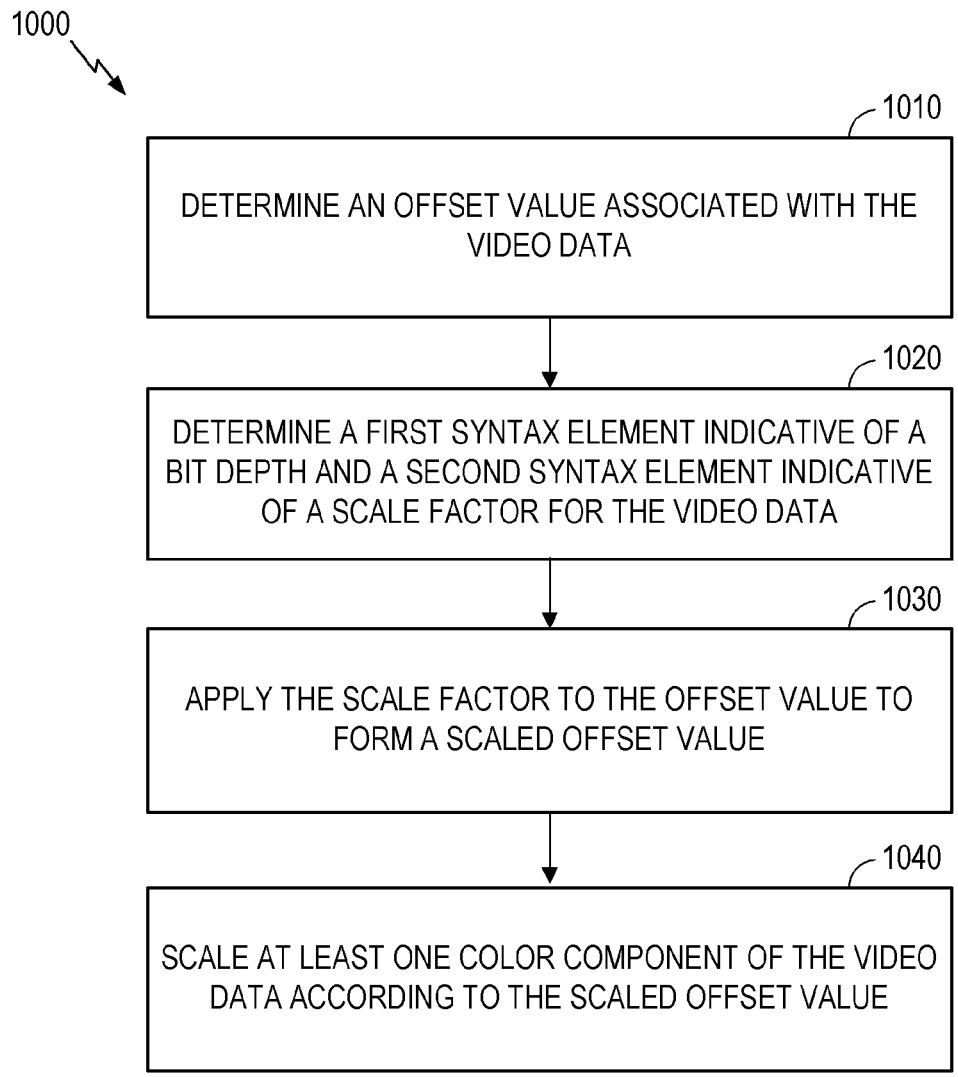
FIG. 10 is a flow chart showing an exemplary method for SAO scaling, in accordance with one or more aspects of this disclosure.

FIG. 10 is a flowchart illustrating a method 1000 for SAO scaling, according to one or more aspects of the present disclosure. The steps illustrated in FIG. 10 may be performed by a video coder, such as, for example, a video encoder (e.g., encoder 400 in FIG. 4 or encoder 800 in FIG. 8), a video decoder (e.g., decoder 500 in FIG. 5 or decoder 900 in FIG. 9), or component(s) thereof.

In one approach, the method 1000 may involve, at block 1010, determining an offset value for an SAO filter applied to the video data to improve reconstruction of signal amplitudes in the video data. Block 1010 may involve receiving the offset value that is signaled at a level of a CTU or the like.

The method 1000 may further involve, at block 1020, determining a first value indicative of a bit depth and a second value indicative of a scale factor for the video data. Block 1020 may involve receiving the second value indicative of the scale factor that is associated with at least one picture of the video data, the second value being signaled at a level of a PPS or the like. In the alternative, or in addition, block 1020 may involve receiving the first value indicative of the bit depth that is associated with a sequence of pictures of the video data.

The method 1000 may further involve, at block 1030, providing a scaled offset value based on applying the scale factor to the offset value. Block 1030 may involve providing the scaled offset value by non-linearly scaling the offset value based at least in part on the scale factor. In the alternative, or in addition, block 1030 may involve determining whether to scale the at least one color component either linearly or non-linearly, based at least in part on a given bit-depth associated with the at least one color component.

In one example, block 1030 may involve determining whether to scale a first group and a second group of color components either linearly or non-linearly, based on a first bit-depth and a second bit-depth associated with the first and second groups, respectively. Block 1030 may further involve scaling the at least one color component by: linearly scaling a first group of color components of the video data according to a first scaled offset value; and non-linearly scaling a second group of color components of the video data according to a second scaled offset value.

The method 1000 may further involve, at block 1040, scaling at least one color component of the video data according to the scaled offset value. Block 1040 may involve scaling the at least one color component that comprises one of a luma value or at least one chroma value associated with a block of the video data.

In one embodiment, where the method 1000 is performed by a video decoder, blocks 1010, 1020, and/or 1030 may be performed by the entropy decoding unit 510 of the decoder 500 in FIG. 5 (or the entropy decoding unit 910 of the decoder 900 in FIG. 9). The entropy decoding unit 510 may be configured to perform blocks 1010, 1020, and/or 1030 by operating in conjunction with other component(s) of the decoder 500, such as, for example, the prediction compensation unit 516, the deblock filter 518, and/or the SAO filter 520, or subcomponent(s) thereof. Block 1040 may be performed by the offset up-scaler 512 or the like, alone or in conjunction with the other component(s) of the decoder 500, such as, for example, the deblock filter 518, entropy decoding unit 510, and/or the SAO filter 520, or subcomponent(s) thereof.

For example, the entropy decoding unit 510 may be configured to perform block 1010 by receiving an encoded offset value for the SAO filter 520 applied to the video data to improve reconstruction of signal amplitudes or the like in the video data. The entropy decoding unit 510 may be configured to perform block 1020 by determining a first value indicative of a bit depth and a second value indicative of a scale factor for the video data, and by providing a decoded offset value based on entropy decoding the encoded offset value. The entropy decoding unit 510 may be configured to perform block 1030 by providing a scaled offset value or the like based on applying the scale factor to the decoded offset value. The offset up-scaler 512 may be configured to perform block 1040 by scaling at least one color component of the video data according to the scaled offset value or variation thereof.

In another embodiment, where the method 1000 is performed by a video encoder, blocks 1010, 1020, and/or 1030 may be performed by the SAO parameter estimator 422 of the encoder 400 in FIG. 4 (or the SAO parameter estimator 824 of the encoder 800 in FIG. 8). The SAO parameter estimator 422 may be configured to perform blocks 1010, 1020, and/or 1030 by operating in conjunction with other component(s) of the encoder 400, such as, for example, the entropy coder 414, the deblock filter 420, the prediction compensator 418, and/or the SAO filter 428, or subcomponent(s) thereof. Block 1040 may be performed by the offset down-scaler 424 and the offset up-scaler 426. The offset down-scaler 424 and/or the offset up-scaler 426 may be configured to perform block 1040 by operating in conjunction with other component(s) of the encoder 400, such as, for example, the entropy coder 414, the deblock filter 420, the SAO parameter estimator 422 and/or the SAO filter 428, or subcomponent(s) thereof.

For example, the SAO parameter estimator 422 may be configured to perform block 1010 by determining an offset value for the SAO filter 428 applied to the video data to improve reconstruction of signal amplitudes or the like in the video data. The SAO parameter estimator 422 may be configured to perform block 1020 by generating a first value indicative of a bit depth and a second value indicative of a scale factor for the video data, and by providing an encoded offset value based on entropy encoding the offset value. The SAO parameter estimator 422 may be configured to perform block 1030 by providing a scaled offset value or the like based on applying the scale factor to the encoded offset value. The offset down-scaler 424 and the offset up-scaler 426 may be configured to perform block 1040 by scaling at least one color component of the video data according to the scaled offset value or variation thereof.

Figure 11:
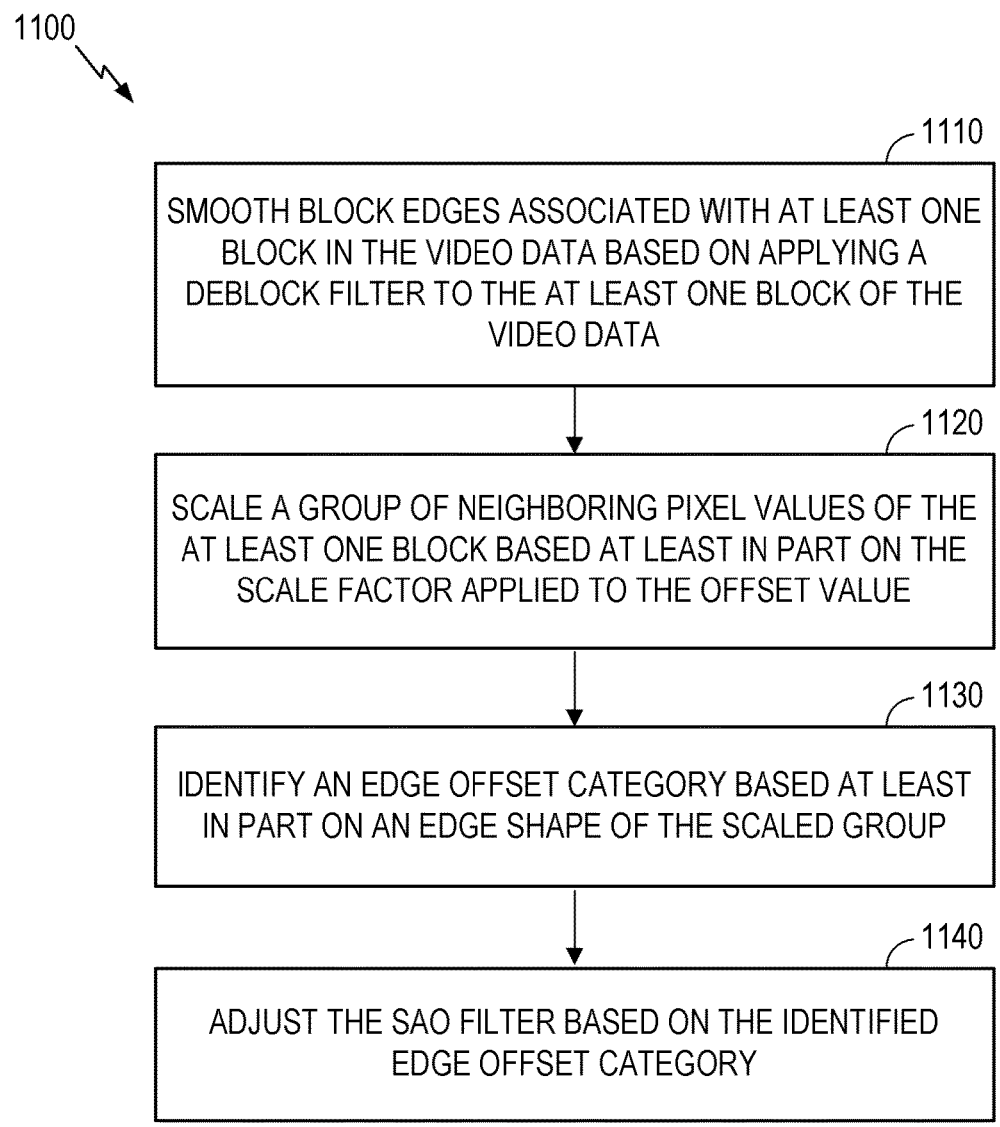
FIG. 11 is a flow chart showing an exemplary method for pixel value scaling for edge offset categorization, in accordance with one or more aspects of this disclosure.

FIG. 11 provides a flowchart illustrating a method 1100 for pixel value scaling for edge offset categorization that may be performed in conjunction with or independently of the method 1100, according to one or more aspects of the present disclosure. The steps illustrated in FIG. 11 may be performed by a video coder, such as, for example, a video encoder (e.g., encoder 800 in FIG. 8), a video decoder (e.g., decoder 900 in FIG. 9), or component(s) thereof.

In one approach, the method 1100 may involve, at block 1110, smoothing block edges associated with at least one block in the video data based on applying a deblock filter to the at least one block of the video data. The method 1100 may further involve, at block 1120, scaling a group of neighboring pixel values of the at least one block based at least in part on the scale factor applied to the offset value. The method 1100 may further involve, at block 1130, identifying an edge offset category based at least in part on an edge shape of the scaled group. The method 1100 may further involve, at block 1140, adjusting the SAO filter based on the identified edge offset category.

In related aspects, there is provided an apparatus for video coding that includes a memory unit configured to store video data. The apparatus may include at least one processor in communication with the memory, wherein the at least one processor may be configured to perform blocks 1010, 1020, 1030, and/or 1040 in FIG. 10. In the alternative, or in addition, the at least one processor may be configured to perform blocks 1110, 1120, 1130, and/or 1140 in FIG. 11.

In further related aspects, the at least one processor of the apparatus may include a standalone processor and/or sub-component processor(s) included within one or more component(s) of a video decoder (e.g., decoder 500 or 900) and/or a video encoder (e.g., encoder 400 or 800). The memory unit of the apparatus may be specifically configured for processing video data. For example, the memory unit may include one or more solid state drives (SSDs) and/or flash memory component(s) of sufficient size and speed to process, store, and retrieve video data, without slowing down the video coding process. In one implementation, the memory unit may include a memory multiplexing component, a two-dimensional cache unit, or the like to expedite the processing of video data by the memory unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. An apparatus for video decoding, comprising:
a memory unit configured to store video data reconstructed based on an encoded video bitstream that includes a plurality of color components;
a processor in communication with the memory unit, the processor configured to:
decode, from the encoded video bitstream, an offset value for a sample adaptive offset (SAO) filter applied to the reconstructed video data, wherein the offset value is within a first range of offset values;
decode, from a picture parameter set (PPS) of the encoded video bitstream, a first value indicative of a first scale factor for a first chroma component of the reconstructed video data, the first scale factor being different than a second scale factor for a first luma component of the reconstructed video data;
apply a non-linear function to the offset value to provide a scaled offset value based on applying the first scale factor to the offset value, wherein the scaled offset value is within a second range of offset values, and wherein the second range of offset values comprises more values than the first range of offset values;

generate a filtered chroma component via adding the scaled offset value to the first chroma component of the reconstructed video; and decode the reconstructed video data according to the filtered chroma component.

2. The apparatus of claim 1, wherein the processor is further configured to decode the offset value that is encoded at a level of a coding tree unit (CTU).

3. The apparatus of claim 1, wherein the processor is further configured to decode a second value indicative of the scale factor, the second value being encoded in the PPS.

4. The apparatus of claim 1, wherein the processor is further configured to decode a third value indicative of a bit depth that is associated with a sequence of pictures of the video data.

5. The apparatus of claim 1, wherein the processor is further configured to apply the non-linear function to provide the scaled offset value based on non-linearly scaling the offset value based at least in part on the first scale factor.

6. The apparatus of claim 1, wherein the processor is further configured to determine to scale the offset value non-linearly, based at least in part on a given bit-depth associated with the first chroma component.

7. The apparatus of claim 1, wherein the processor is further configured to determine whether to scale a first group and a second group of color components either linearly or non-linearly, based on a first bit-depth and a second bit-depth associated with the first and second groups, respectively.

8. The apparatus of claim 7, wherein the processor is further configured to generate a plurality of scaled color components based on:

linearly scaling a first offset value of a first group of color components of the reconstructed video data according to a third scale factor; and non-linearly scaling a second offset value of a second group of color components of the reconstructed video data according to a fourth scale factor.

9. The apparatus of claim 1, wherein the processor is further configured to:

smooth block edges associated with at least one block in the video data based on applying a deblock filter to the at least one block of the reconstructed video data;

add the scaled offset value to a group of neighboring pixel values of the at least one block based at least in part on the first scale factor applied to the offset value;

identify an edge offset category based at least in part on an edge shape of the scaled group; and adjust the SAO filter based on the identified edge offset category.

10. A method of decoding video data that includes a plurality of color components, the method comprising:

decoding, from an encoded video bitstream, an offset value for a sample adaptive offset (SAO) filter applied to video data reconstructed based on the encoded video bitstream, wherein the offset value is within a first range of offset values;

decoding, from a picture parameter set (PPS) of the encoded video bitstream, a first value indicative of a first scale factor for a first chroma component of the reconstructed video data, the first scale factor being different than a second scale factor for a first luma component of the reconstructed video data;

applying a non-linear function to the offset value to provide a scaled offset value based on applying the first scale factor to the offset value, wherein the scaled offset value is within a second range of offset values, and wherein the second of range of offset values comprises more values than the first range of offset values;

generating a filtered chroma component via adding the scaled offset value to the first chroma component of the reconstructed video data; and decoding the reconstructed video data according to the filtered chroma component.

11. The method of claim 10, further comprising decoding the offset value that is encoded at a level of a coding tree unit (CTU).

12. The method of claim 10, further comprising decoding a second value indicative of the second scale factor, the second value being encoded in the PPS.

13. The method of claim 10, further comprising:

smoothing block edges associated with at least one block in the video data based on applying a deblock filter to the at least one block of the video data;

adding the scaled offset value to a group of neighboring pixel values of the at least one block based at least in part on the first scale factor applied to the offset value;

identifying an edge offset category based at least in part on an edge shape of the scaled group; and adjusting the SAO filter based on the identified edge offset category.

14. A non-transitory computer readable medium comprising code that, when executed, causes an apparatus to perform a process comprising:

decoding, from an encoded video bitstream, an offset value for a sample adaptive offset (SAO) filter applied to video data reconstructed based on the encoded video bitstream, wherein the offset value is within a first range of offset values;

decoding, from a picture parameter set (PPS) of the encoded video bitstream, a first value indicative of a first scale factor for a first chroma component of the reconstructed video data, the first scale factor being different than a second scale factor for a first luma component of the reconstructed video data;

applying a non-linear function to the offset value to provide a scaled offset value based on applying the first scale factor to the offset value, wherein the scaled offset value is within a second range of offset values, and wherein the second range of offset values comprises more values than the first range of offset values;

generating a filtered chroma component via adding the scaled offset value to the first chroma component of the reconstructed video data; and decoding the reconstructed video data according to the filtered chroma component.

* * * * *